(12) United States Patent
McCormick

(10) Patent No.: US 7,052,041 B2
(45) Date of Patent: May 30, 2006

(54) GAS GENERATOR AND GAS GENERANT PACKET USED THEREIN

(75) Inventor: David M. McCormick, St. Clair Shores, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 10/929,041

(22) Filed: Aug. 27, 2004

(65) Prior Publication Data

US 2005/0104348 A1    May 19, 2005

Related U.S. Application Data

(60) Provisional application No. 60/498,715, filed on Aug. 28, 2003.

(51) Int. Cl.
*B60R 21/28* (2006.01)

(52) U.S. Cl. .................................... 280/741
(58) Field of Classification Search ............... 280/741, 280/737, 740, 742
See application file for complete search history.

(56) References Cited

U.S. PATENT DOCUMENTS

| | | | |
|---|---|---|---|
| 2,995,088 A | 8/1961 | Asplund | |
| 5,772,243 A | 6/1998 | Green et al. | |
| 5,941,752 A * | 8/1999 | Liebermann | 446/220 |
| 6,805,376 B1 * | 10/2004 | Mizuno | 280/737 |

* cited by examiner

*Primary Examiner*—Faye M. Fleming
(74) *Attorney, Agent, or Firm*—L.C. Begin & Associates, PLLC

(57) ABSTRACT

A gas generator 10 and a gas generant packet 30 for use in an inflatable vehicle occupant protection system. The gas generator includes a housing 12, an igniter 18, and one or more gas generants 23 and/or 40 are positioned in a combustion chamber 24 defined by the housing 12. One or more of the gas generants 23 and/or 40 are enclosed in a substantially gas-and-moisture-impermeable container 30 disconnected from the housing 12, or suspended within the chamber 24, thereby forming pocket of gas generant therein. The container 30 may be formed from a polymer or polyester film. The gas generant packet may be variably positionable within the combustion chamber 24 prior to activation of the igniter 18. A method for manufacturing a gas generator 10 and a method for activating a gas generator 10 are also disclosed.

13 Claims, 4 Drawing Sheets

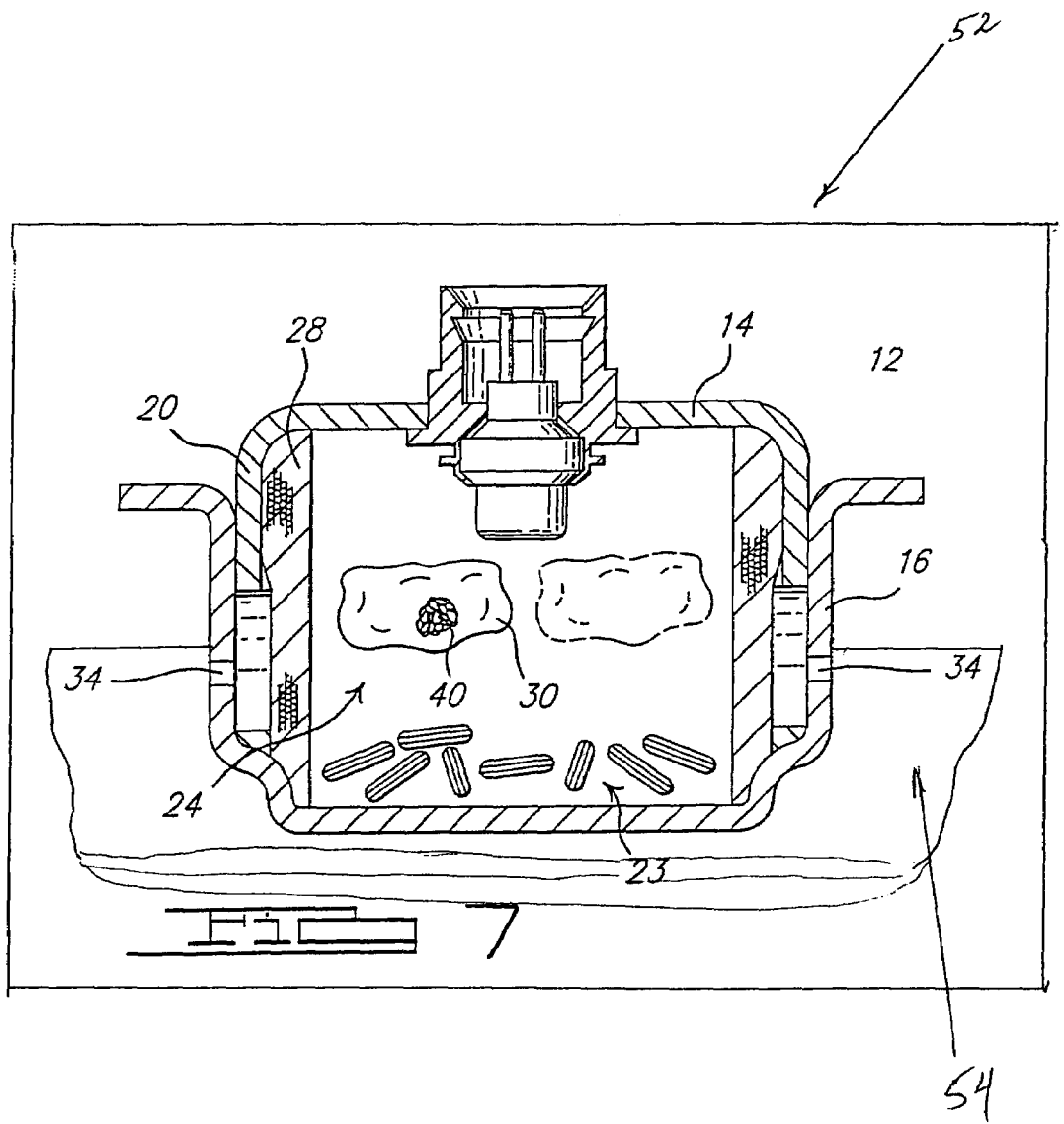

US 7,052,041 B2

GAS GENERATOR AND GAS GENERANT PACKET USED THEREIN

CROSS-REFERENCE TO RELATED APPLICATION

This application is entitled to and claims the benefit of Provisional Patent Application Ser. No. 60/498,715, filed on Aug. 28, 2003.

BACKGROUND OF THE INVENTION

The present invention relates generally to vehicle occupant protection systems, and more particularly to gas generators employed in occupant protection systems incorporating inflatable protection devices.

Gas generators for use in inflatable vehicle occupant safety systems are well-known in the field of vehicle safety systems. Typically, such gas generators comprise a housing defining a combustion chamber, with a first, booster charge and a main gas generating charge positioned in the housing. An igniter, or squib, is also positioned in the housing to ignite the booster charge. Upon a crash event, combustion of the booster charge is typically initiated by providing an electrical signal to the igniter. Ignition of the booster charge induces ignition of the main charge, thereby providing the bulk of the inflation gas used to inflate an associated inflatable safety device.

Isolating the booster charge from the main charge is known to improve the combustion and, consequently, the gas generation of the main charge. Thus, the booster charge is physically separated from the main gas generant charge by features incorporated into, or attached to, the housing structure. Foils, burst shims, and similar components may be used to form a fluid isolation barrier between the respective chambers and are ruptured by the creation of hot combustion gases upon activation of the booster charge. In addition, various inflator structures such as walls, cups, tubes, etc., may be used to form the structure necessary to fluidly isolate the respective charges and to impart sufficient structural integrity to the inflator to withstand the forces attendant to activation. Combustion of the booster charge bursts one or more of the barriers fluidly isolating the booster charge from the main charge. However, manufacturing of the structures needed to isolate the booster charge from the main charge requires significant manufacturing time and effort, and requires additional material.

SUMMARY OF THE INVENTION

In a preferred embodiment, the invention encompasses a vehicle occupant protection system comprising a gas generator having a housing defining an interior combustion chamber, and an igniter coupled to the housing. A first gas generant is positioned in the combustion chamber and functions as a main gas generant, and a second gas generant is positioned in the combustion chamber intermediate the igniter and the first gas generant, and functions as a booster gas generant. Activation of the igniter ignites the second gas generant and ignition of the second gas generant ignites the first gas generant. In addition, at least one of the gas generants is enclosed in a substantially gas-and-moisture-impermeable container, thereby forming a gas generant packet disconnected from the housing. The container may be formed from a polyester film. The gas generant packet may be variably positionable within the combustion chamber prior to activation of the igniter.

In another embodiment, the invention encompasses a method for manufacturing a gas generator, comprising the steps of providing a gas generator housing defining an interior combustion chamber, providing a pre-determined quantity of a first gas generant, providing a pre-determined quantity of a second gas generant, providing a substantially gas-and-moisture-impermeable container disconnected from the housing, enclosing at least one of the first and second gas generants in the container, providing an igniter in communication with the combustion chamber, positioning the first gas generant in the combustion chamber, and positioning the second gas generant in the combustion chamber intermediate the igniter and the first gas generant. Stated another way, the first and second gas generant gas compositions are proximate to, or in ignitable communication with the igniter.

In yet another embodiment, the invention encompasses a method for activating a gas generator, comprising the steps of providing a gas generator housing defining an interior combustion chamber, providing an igniter in communication with the combustion chamber, providing at least one gas generant and preferably a second gas generant within the combustion chamber, or providing at least one gas generant and preferably a plurality of gas generants, encapsulating or sealing at least one of the first and second gas generants wherein either gas generant or both are enclosed in a substantially gas-and-moisture-impermeable container disconnected from the housing, positioning the second gas generant in the combustion chamber intermediate the igniter and the first gas generant, and actuating the igniter to ignite the second gas generant, whereby ignition of the second gas generant thereby ignites the first gas generant in ignitable and combustible communication therewith.

In yet another aspect of the invention, the invention includes a gas generant packet for use in a gas generator, wherein the packet includes a predetermined quantity of a gas generant sealed in a substantially gas-and-moisture-impermeable Mylar® container. Use of the moisture and gas impermeable container provides an improved method of assembly by ensuring that the same amount of propellant is included in each inflator. Furthermore, packaging of any one of the gas generants inhibits moisture retention during shipping or during storage of the respective gas generant prior to integration within an inflator. This is particularly useful for hygroscopic propellants, for example. Both advantages result in reduced performance variability of any inflator incorporating the propellant either due to propellant measurement fluctuations during propellant loading, or, due to propellant uptake of moisture given hygroscopic properties of the propellant and/or given humid conditions of assembly or storage.

The disclosed inflator structure provides several advantages over existing inflators. A wall of the container separates the gas generant enclosed in the container from any gas generant outside the container; thus, the body of the inflator need not incorporate structure for separating multiple quantities of gas generant. Also, the only structure required to withstand the forces produced by gas generant combustion is the combustion chamber itself. The weight of the inflator is thereby reduced.

In addition, by providing a pre-weighed gas generant charge enclosed in a container disconnected from the structure of the inflator, the time required to assemble the inflator is reduced. There is no need to measure a desired quantity of a gas generant at the gas generator assembly site, and there is no need to position the measured quantity of gas generant into a specially designed portion of the inflator structure. A container holding the pre-measured amount of gas generant is simply placed inside the combustion chamber between the igniter and another quantity of gas generant.

Any pre-determined quantity of a desired gas generant can be enclosed in the container. Also, as the container is substantially gas-and-moisture-impermeable, the gas generant may be chemically incompatible with a gas generant outside the container. The ability to concentrate pre-determined quantities of gas generant in desired location in the combustion chamber, and the ability to position one or more chemically incompatible gas generants in proximity inside the same combustion chamber, increase system flexibility and permit greater control of the system combustion profile.

Moreover, enclosing a gas generant charge in a container as described herein has been shown to attenuate the overall combustion profile of the gas generant system. Rather than an initially sharp spike of gas production, the most aggressive portion of gas production is deferred to a point later in the combustion profile. Consequently, an inflatable safety device deployed using a gas generator constructed according to the present invention will generally undergo the most aggressive portion of gas inflation at a point later in the device deployment process than would otherwise occur. The result is a smoother inflation of the inflatable cushion or airbag, resulting in a gradual inflation of the cushion and superior protection of the occupant in many instances.

These and other features and advantages of various embodiments of the invention will become apparent from the following detailed description, the accompanying drawings, and the claims.

BRIEF DESCRIPTION OF THE DRAWINGS

In the drawings illustrating embodiments of the present invention:

FIG. 7 is a schematic view of a vehicle occupant protection system comprising an inflator of the present invention, wherein the inflator includes at least one contained propellant.

DETAILED DESCRIPTION

Figure 1:
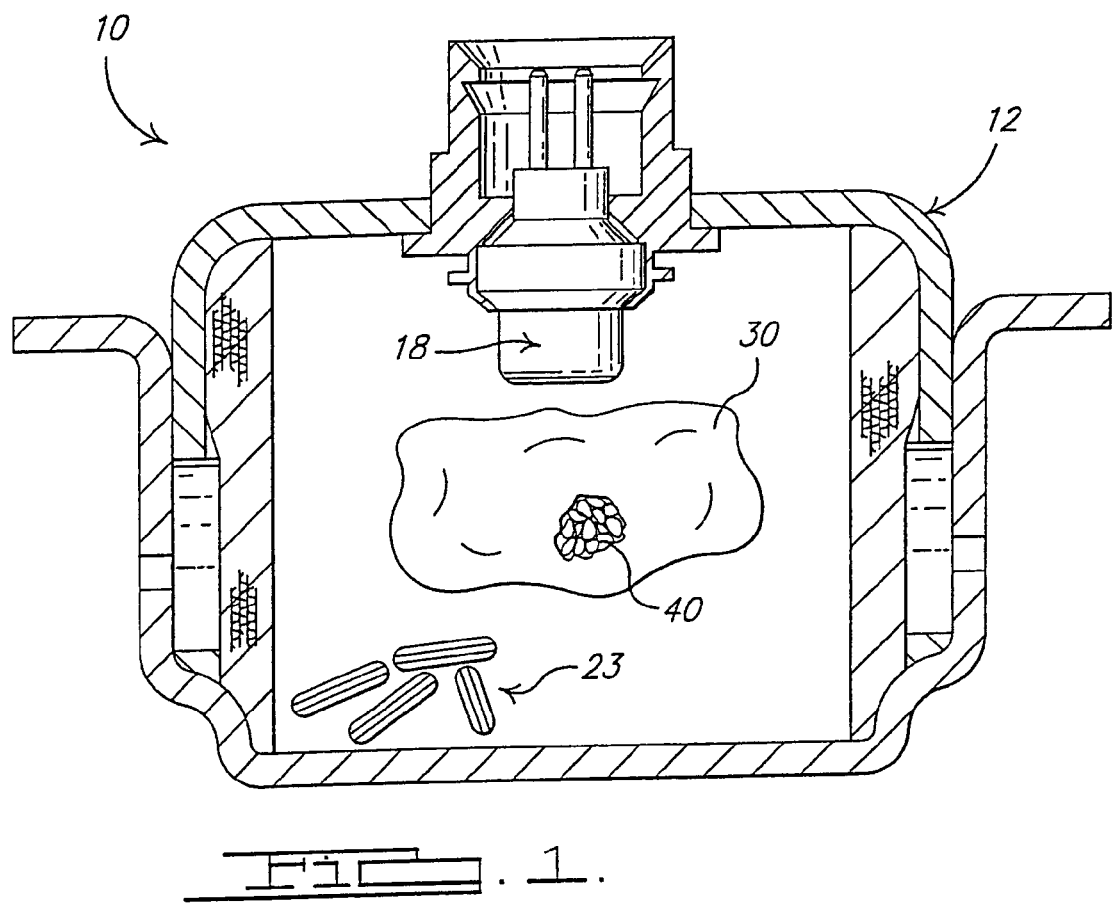
FIG. 1 is a cross-sectional view of the interior of a gas generator in accordance with a first embodiment of the present invention.

FIG. 1 shows one embodiment of a gas generator 10 in accordance with the present invention. Gas generator 10 is operable to supply pressurized gas to an inflatable safety restraint device of a vehicle occupant protection system, thereby protecting a vehicle occupant in the event of a crash or sudden deceleration.

In the embodiment shown, gas generator 10 includes a housing 12 having an upper housing portion 14 and a lower housing portion 16 secured to each other in a nested or abutting relationship using any of a variety of known methods, for example crimping, welding, adhesive bonding, or the application of fasteners. Housing 12 includes a peripheral wall 20 defining an interior combustion chamber 24 for receiving pre-determined amounts of one or more gas generant compositions therein, in a manner described in detail below.

One or more apertures 34 are formed in one or both of housing portions 14 and 16 to permit fluid communication between combustion chamber 24 and an exterior of the chamber. The exterior of chamber 24 proximate apertures 34 is in communication with an interior portion of an inflatable vehicle occupant restraint device (not shown), such as an inflatable air bag, operably associated with gas generator 10. Apertures 34 allow inflation gas produced in combustion chamber 24 to be directed into the inflatable occupant restraint device in a known manner.

One or more filters 28 are provided for filtering combustion products produced by combustion of gas generants contained in combustion chamber 24. A filter 28 is positioned between combustion chamber 24 and each of apertures 34 to filter combustion products from gasses passing from combustion chamber 24 through any of apertures 34. Any suitable metallic mesh filter or woven wire cloth may be used, many examples of which are known and obtainable from commercially available sources (for example, Wayne Wire Cloth Products, Inc. of Bloomfield Hills, Mich.)

An igniter 18 is mounted on upper housing portion 14. Igniter 18 may be any suitable igniter, such as the igniter described in U.S. Pat. No. 5,934,705, herein incorporated by reference. Igniter 18 may be secured to upper housing portion 14 using any of a variety of methods, for example crimping, welding, adhesive bonding, or fasteners. An end of igniter 18 operative to ignite a gas generant composition is positioned so as to be in ignitable communication with combustion chamber 24 upon gas generator 10 activation.

Referring to FIG. 1, in accordance with the present invention, an amount of a first gas generant composition 23 and an amount of a second gas generant composition 40 are positioned in combustion chamber 24. In one embodiment, gas generants 23 and 40 comprise one or more non-azide formulations in tablet form. However, many other suitable gas generant compositions are known in the art. Representative examples of suitable compositions are set forth in U.S. Pat. Nos. 5,035,759, 5,872,329, 6,074,502, and 6,210,505, hereby incorporated by reference. Second gas generant 40 may have the same composition as first gas generant 23, or the first and second gas generants may have different compositions.

Second gas generant 40 is positioned between igniter 18 and first gas generant 23. Generally, second gas generant 40 proximate igniter 18 functions as a booster charge, while first gas generant 23 functions as a main gas generating charge. In this configuration, activation of igniter 18 will ignite second gas generant 40, and ignition of second gas generant 40 will produce sympathetic ignition of first gas generant 23. Stated another way, compositions 23 and 40 ignitably communicate with igniter 18, and are thereby either simultaneously or sequentially ignited.

In addition, at least one of the first and second gas generant compositions is enclosed in a substantially gasand-moisture-impermeable container 30, thereby forming a self-contained gas generant packet disconnected from gas generator housing 12. Thus, container 30 enclosing the gas generant is not formed by any elements or structure of gas generator housing 12. Generally, the appropriate quantity of gas generant to be incorporated into container 30 is weighed at a gas generant production facility, and the desired quantity of gas generant is placed into the container. Container 30 is then shipped to the gas generator assembly point for incorporation into gas generator 10. In one embodiment, container 30 is a bag or pouch formed from a polymeric film such as a polyester film, for example Mylar® or any other similar compound. Polyester films are substantially impervious to moisture and gases. Thus, enclosing a gas generant charge in a container formed from a polymeric film helps to maintain the integrity of the propellant charge when the inflator is stored for long periods of time prior to activation. Moreover, storage of a gas generant in a container as described herein enables two or more chemically incompatible gas generant substances to be stored in the same physical space (for example, as a single combustion chamber) without the occurrence of undesirable chemical reactions between the gas generants. In addition, providing a self-contained, pre-weighed gas generant charge at the gas generator assembly point significantly reduces assembly time required to prepare a desired quantity of gas generant and assemble the gas generant into the gas generator.

Figure 1A:
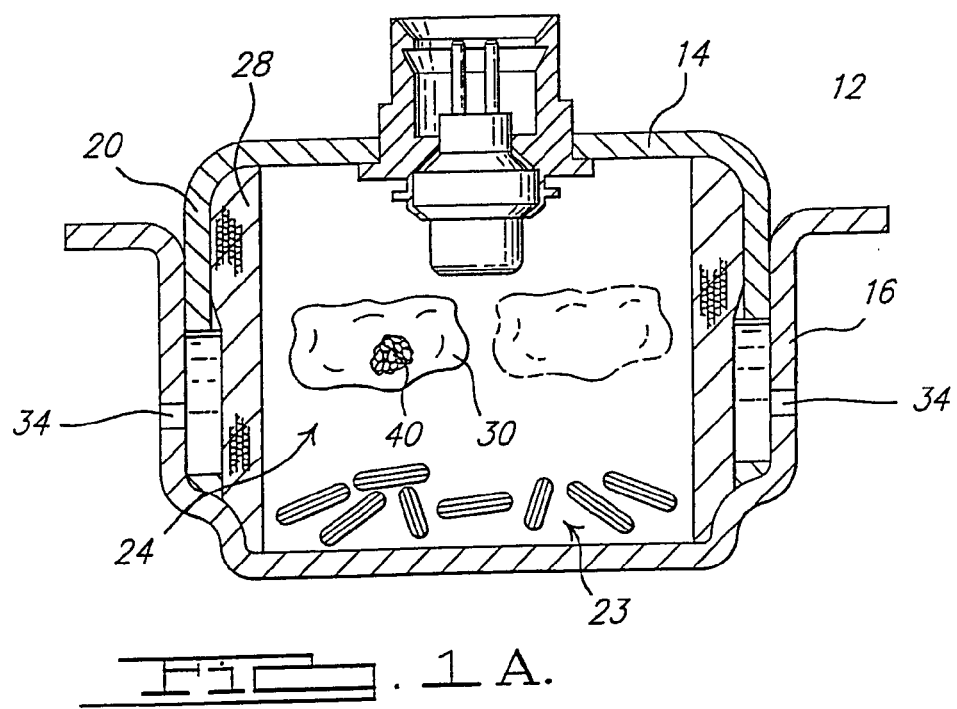
FIG. 1a is the cross-sectional view of the housing in FIG. 1 showing several possible positions of a gas generant container within the housing.

In the embodiment shown in FIG. 1, second gas generant 40 is enclosed in container 30 contained within but disconnected from the housing 12, and first gas generant 23 is distributed loosely across a floor of combustion chamber 24 defined by lower housing portion 16. As may be seen from FIG. 1, container 30 enclosing second gas generant 40 is variably positionable within combustion chamber 24 during assembly and prior to activation of the igniter 18. FIG. 1A shows (in phantom lines) several of the many positions residing between igniter 18 and first gas generant 23 in which container 30 may be placed. Referring again to FIG. 1, in this embodiment, actuation of igniter 18 produces a rupture in a wall of container 30, thereby exposing and igniting second gas generant 40 enclosed in container 30. Ignition of second gas generant 40 causes ignition of first gas generant 23 thereby generating gas to inflate the airbag or inflatable device. It will be appreciated that although sequential ignition of the gas generants is preferred, gas generant 23 and gas generant 40, and any other gas generant, may be ignited sequentially or simultaneously depending on their respective placement within chamber 24 as per design criteria. Accordingly, the container(s) may provide staggered ignition of the gas generants, or, at the very least, may provide measured amounts of propellant that reduce performance variability by ensuring consistent amounts of propellant and also ensuring an environmental seal about the propellant.

Figure 2:
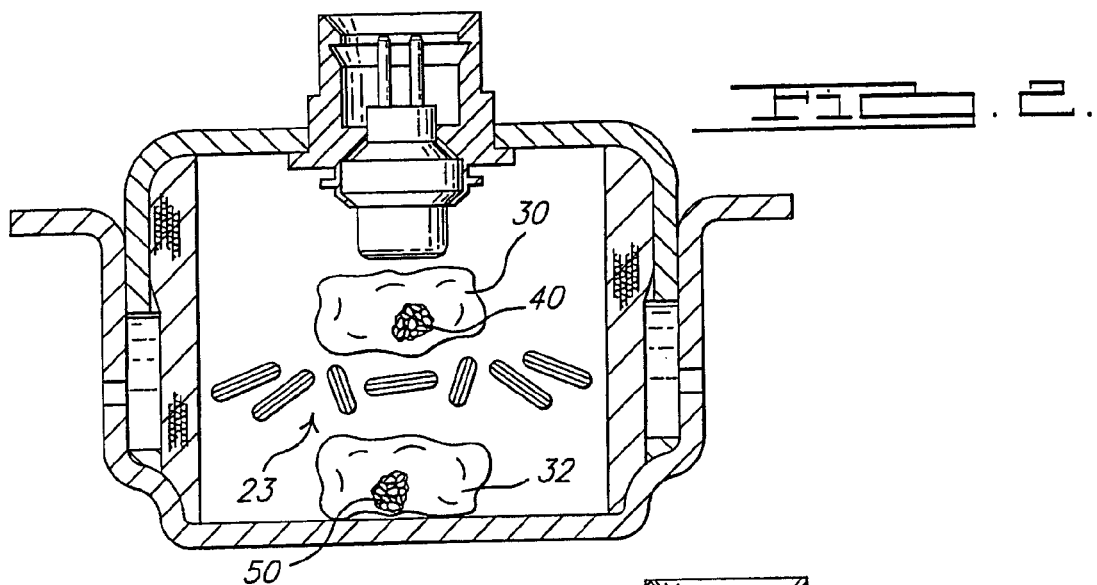
FIG. 2 is a cross-sectional view of the interior of a gas generator in accordance with a second embodiment of the present invention.

Referring to FIG. 2, in a variation on the embodiment shown in FIG. 1, a third gas generant 50 is enclosed in a container 32 adjacent first gas generant 23 and spaced apart from a container 30 enclosing second gas generant composition 40. In this embodiment, ignition of first gas generant 23 by second gas generant 40 produces a rupture in a wall of container 32 enclosing third gas generant 50, thereby exposing and igniting third gas generant 50 contained therein.

Figure 3:
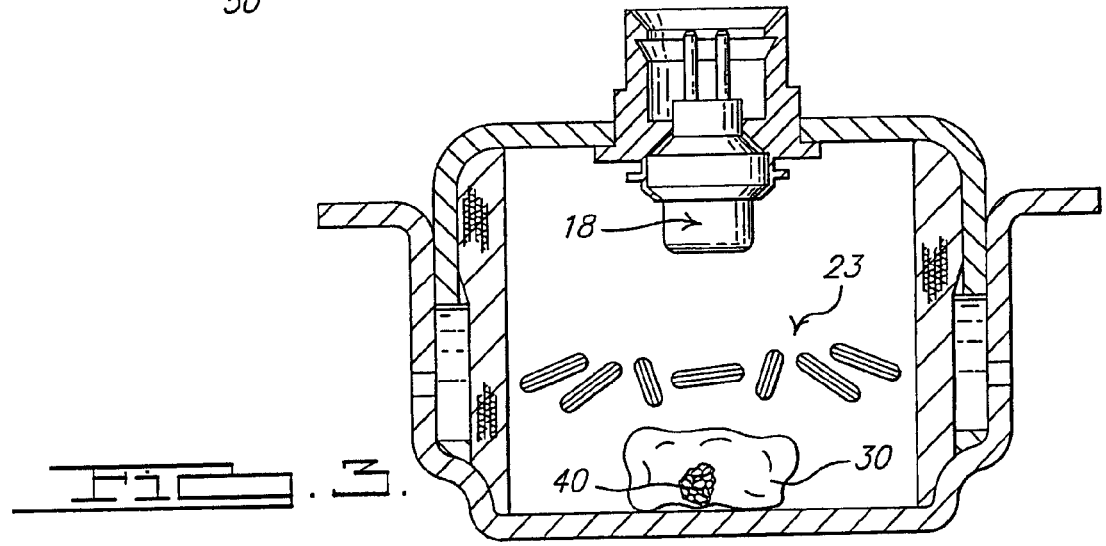
FIG. 3 is a cross-sectional view of the interior of a gas generator in accordance with a third embodiment of the present invention.

Referring to FIG. 3, in another embodiment of the invention, second gas generant 40 is enclosed in container 30 and first gas generant 23 is distributed loosely within combustion chamber 24, partially or totally covering container 30 enclosing first gas generant 40. As may be seen from FIG. 3, in this configuration, container 30 is variably positionable within combustion chamber 24 prior to activation of the igniter. In this embodiment, ignition of second gas generant 23 by igniter 18 produces a rupture in a wall of container 30, thereby exposing and igniting first gas generant 40 enclosed in container 30.

Figure 4:
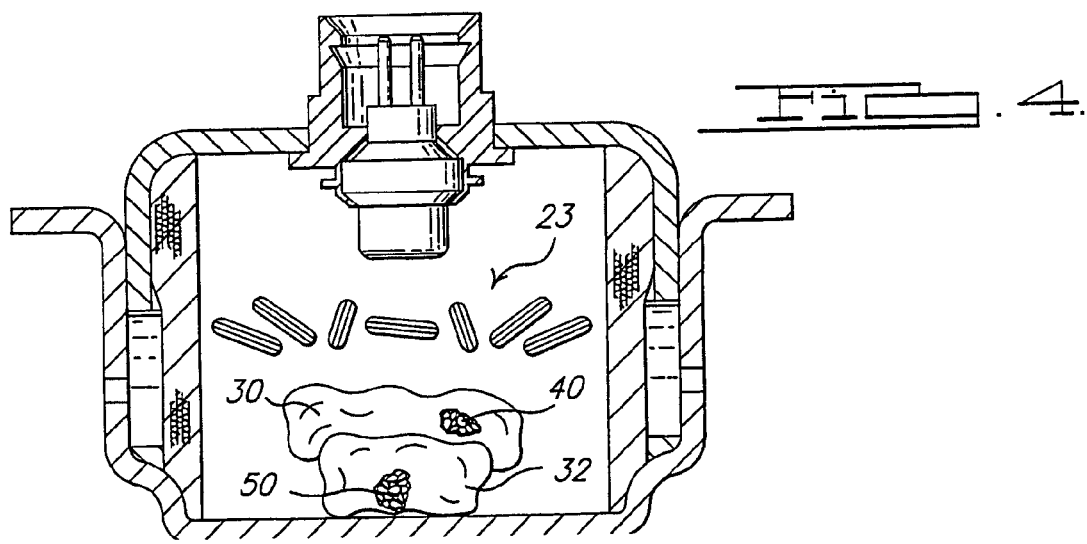
FIG. 4 is a cross-sectional view of the interior of a gas generator in accordance with a fourth embodiment of the present invention.

Referring to FIG. 4, in a variation on the embodiment shown in FIG. 3 a third gas generant composition 50 is enclosed in a container 32 adjacent container 30 enclosing second gas generant 40. Container 32 is spaced apart from first gas generant composition 23. In this embodiment, ignition of second gas generant 40 by first gas generant 23 produces a rupture in a wall of container 32 enclosing third gas generant 50, thereby exposing and igniting third gas generant 50.

Figure 5:
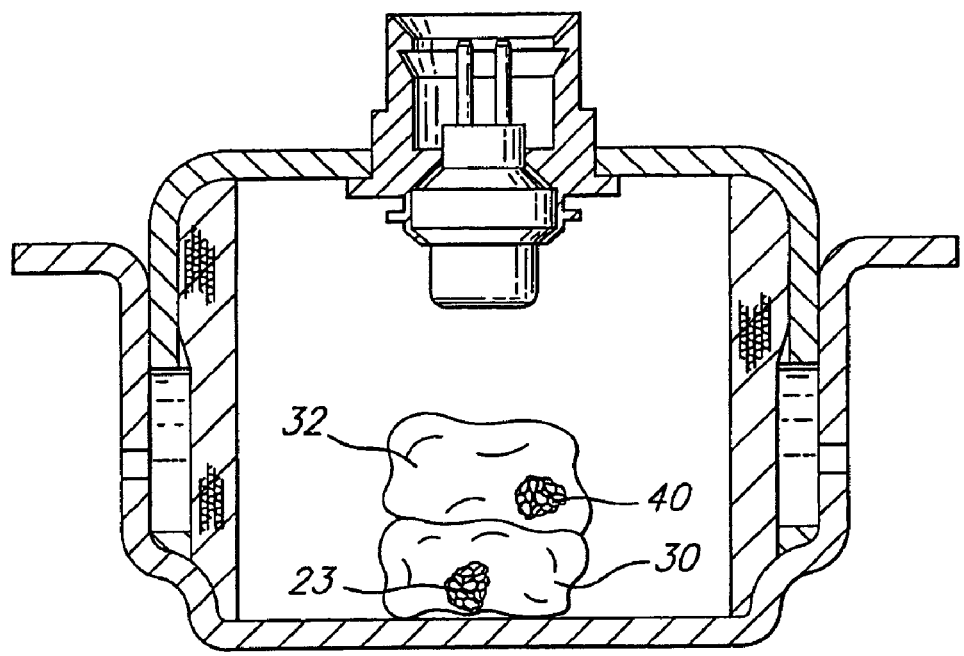
FIG. 5 is a cross-sectional view of the interior of a gas generator in accordance with a fifth embodiment of the present invention.

Referring to FIG. 5, in yet another embodiment, both first gas generant 23 and second gas generant 40 are enclosed in separate containers 30 and 32, respectively. As may be seen in FIG. 5, both containers 30 and 32 are variably positionable within combustion chamber 24, provided container 32 enclosing second gas generant 40 is positioned intermediate igniter 18 and container 30 enclosing first gas generant 23. In this embodiment, actuation of igniter 18 produces a rupture in a wall of container 32, thereby exposing and igniting second gas generant 40 enclosed in container 32. Ignition of second gas generant 40 then produces a rupture in a wall of container 30, thereby exposing and igniting first gas generant 23 enclosed in container 30.

Figure 6:
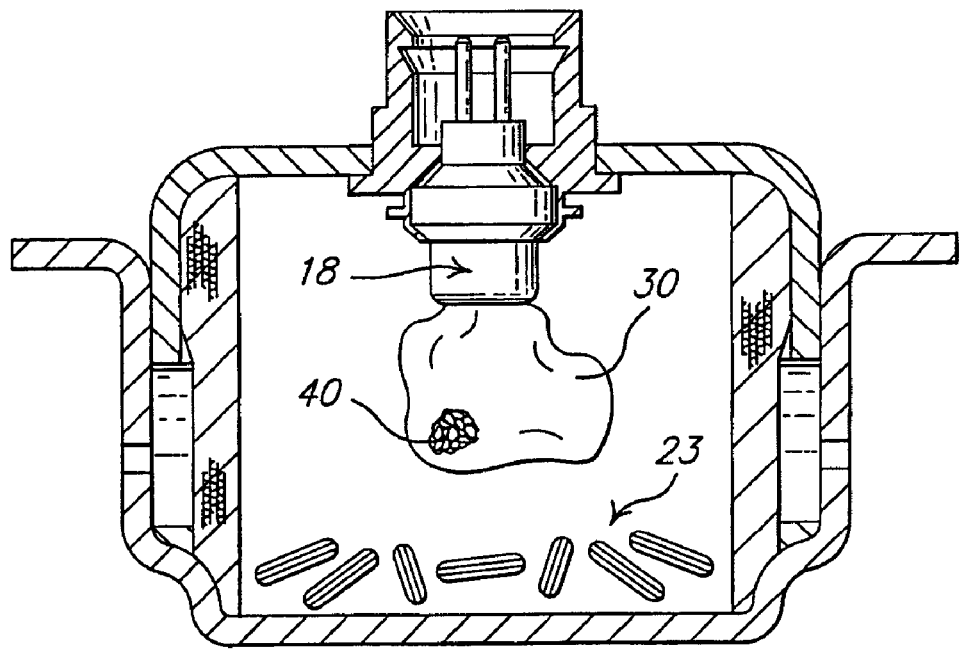
FIG. 6 is a cross-sectional view of the interior of a gas generator in accordance with a sixth embodiment of the present invention, showing an interior portion of an igniter in communication with an interior portion of a gas generant container.

FIG. 6 shows yet another embodiment of the present invention in which container 30 is coupled to igniter 18 so that an interior portion of container 30 is in communication with an interior portion of igniter 18. Actuation of igniter 18 will ignite a gas generant enclosed in container 30, thereby producing a rupture of container 30 and sympathetic ignition of any gas generant outside and proximate to the container.

FIG. 7 illustrates a schematic representation of a vehicle occupant protection system 52 incorporating an inflator 10 as illustrated in FIGS. 1–6, wherein the vehicle occupant protection 52 is illustrated prior to deployment. An airbag or inflatable component 54 fluidly communicates with gas exit orifices 34 of the gas generator 10 thereby facilitating inflation of the airbag. Upon a crash event, a crash sensor (not shown) responds in a known manner to deceleration as computed by an associated computer algorithm within an onboard computer (not shown). Accordingly, as deceleration is detected, the onboard computer sends a signal to the initiator 18 indicative of a crash event and therefore of the need of the vehicle occupant protection system 52. One of ordinary skill in the art will readily appreciate the various known constituents of a typical vehicle occupant protection system including but not limited to airbags, airbelts, and/or other inflatable components, and modules housing the various constituents.

In sum, each of the configurations represented by the figures illustrates an arrangement that results in a relatively gradual combustion process given the separation of the charges by the container or containers. It will be appreciated that the various charges are preferably distinctive in composition, although, the relative delay in ignition of the contained propellant(s) caused by the container(s) may provide graduated combustion of two or more segregated portions of the same propellant or gas generant.

It should be understood that the preceding is merely a detailed description of certain embodiments of this invention and that numerous changes to the disclosed embodiment can be made in accordance without departing from the scope of the invention as defined in the appended claims. For example, the present invention is applicable to any inflatable vehicle occupant safety device, to include airbags and airbelts. The preceding description, therefore, is not meant to limit the scope of the invention. Rather, the scope of the invention is to be determined only by the appended claims and their equivalents.

The invention claimed is:

1. A vehicle occupant protection system comprising:
   a gas generator having a housing defining an interior combustion chamber;
   an igniter coupled to the housing and ignitably communicating with the combustion chamber;
   an amount of a first gas generant positioned in the combustion chamber; and
   an amount of a second gas generant positioned in the combustion chamber intermediate the igniter and the first gas generant, at least one of the first and second gas generants being enclosed in a substantially gas-and-moisture-impermeable container,
   wherein activation of the igniter ignites the second gas generant and ignition of the second gas generant ignites the first gas generant, and the container is variably positionable within the combustion chamber.

2. The vehicle occupant protection system of claim 1, wherein an interior portion of the igniter is in communication with an interior portion of the container.

3. The vehicle occupant protection system of claim 1, wherein the container comprises a bag formed from a polyester film.

4. The vehicle occupant protection system of claim 1, wherein the second gas generant is enclosed in the container and activation of the igniter produces a rupture ma wall of the container, thereby exposing the second gas generant contained therein and igniting the second gas generant.

5. The vehicle occupant protection system of claim 1, further comprising a third gas generant enclosed in another container positioned adjacent the first gas generant and spaced apart from the container enclosing the second gas generant, and wherein ignition of the first gas generant by the second gas generant produces a rupture in a wall of the other container enclosing the third gas generant, thereby exposing the third gas generant contained therein and igniting the third gas generant.

6. The vehicle occupant protection system of claim 1, wherein the second gas generant has a different composition than the first gas generant.

7. The vehicle occupant protection system of claim 1, wherein the other of the first and second gas generant is enclosed in a second container.

8. The vehicle occupant protection system of claim 7, wherein the second container is variably positionable within the combustion chamber prior to activation of the igniter.

9. The vehicle occupant protection system of claim 7, wherein the second container is substantially gas-and-moisture-impermeable.

10. The vehicle occupant protection system of claim 7, wherein the second container comprises a bag formed from a polyester film.

11. The vehicle occupant protection system of claim 1, wherein the first gas generant is enclosed in the container and ignition of the second gas generant by the igniter produces a rupture in a wall of the container, thereby exposing the first gas generant contained therein and igniting the first gas generant.

12. The vehicle occupant protection system of claim 11, further comprising a third gas generant enclosed in another container adjacent the container enclosing the first gas generant and spaced apart from the second gas generant, and wherein ignition of the first gas generant by the second gas generant produces a rupture in a wall of the container enclosing the third gas generant, thereby exposing the third gas generant contained therein and igniting the third gas generant.

13. A gas generator comprising:
   a housing defining an interior combustion chamber;
   an igniter coupled to the housing and ignitably communicating with the combustion chamber;
   an amount of a first gas generant positioned in the combustion chamber; and
   an amount of a second gas generant positioned in the combustion chamber intermediate of the igniter and the first gas generant, at least one of the first and second gas generants being enclosed in a substantially gas-and-moisture-impermeable container,
   wherein activation of the igniter ignites the second gas generant prior to or simultaneously with ignition of the first gas generant, and the container is variably positionable within the combustion chamber.

* * * * *